(12) United States Patent
Wu et al.

(10) Patent No.: US 7,733,811 B2
(45) Date of Patent: Jun. 8, 2010

(54) METHOD AND SYSTEM FOR BRIDGING TRAFFIC IN A RESILIENT PACKET RING NETWORK

(75) Inventors: Guoliang Wu, Plano, TX (US); Srinivas Vunnava, Plano, TX (US); Thomas K. Brown, Plano, TX (US); David M. Colven, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1289 days.

(21) Appl. No.: 10/942,016

(22) Filed: Sep. 15, 2004

(65) Prior Publication Data

US 2006/0056425 A1    Mar. 16, 2006

(51) Int. Cl.
H04L 12/28    (2006.01)
(52) U.S. Cl. ..................................... 370/258
(58) Field of Classification Search ......... 370/254–258, 370/466
See application file for complete search history.

(56) References Cited

U.S. PATENT DOCUMENTS

| | | | |
|---|---|---|---|
| 6,426,955 B1 * | 7/2002 | Gossett Dalton et al. | 370/352 |
| 6,574,227 B1 * | 6/2003 | Rosenberg et al. | 370/395.65 |
| 6,625,158 B1 * | 9/2003 | Alexander et al. | 370/401 |
| 6,987,756 B1 * | 1/2006 | Ravindranath et al. | 370/352 |
| 7,102,997 B2 * | 9/2006 | Sultan et al. | 370/233 |
| 7,120,119 B2 * | 10/2006 | Frelechoux et al. | 370/255 |
| 7,149,225 B2 * | 12/2006 | Thubert et al. | 370/401 |
| 7,190,678 B2 * | 3/2007 | Thubert et al. | 370/254 |
| 7,203,175 B2 * | 4/2007 | Thubert et al. | 370/254 |
| 2002/0038419 A1 * | 3/2002 | Garrett et al. | 713/154 |
| 2002/0131414 A1 * | 9/2002 | Hadzic | 370/393 |
| 2003/0083009 A1 * | 5/2003 | Freyman et al. | 455/26.1 |
| 2003/0108041 A1 * | 6/2003 | Aysan et al. | 370/389 |
| 2004/0008670 A1 * | 1/2004 | Deng | 370/352 |
| 2004/0047345 A1 * | 3/2004 | Joseph et al. | 370/352 |
| 2004/0085961 A1 * | 5/2004 | Coffell et al. | 370/392 |
| 2004/0170184 A1 * | 9/2004 | Hashimoto | 370/401 |
| 2005/0195799 A1 * | 9/2005 | Burne et al. | 370/352 |

OTHER PUBLICATIONS

IEEE Standards Activities Department, IEEE Draft P802.17/D3.3, "Part 17: Resilient Packet Ring (RPR) Access and Method & Physical Layer Specifications", Apr. 21, 2004.

* cited by examiner

Primary Examiner—Gregory B Sefcheck
Assistant Examiner—Joshua Smith
(74) Attorney, Agent, or Firm—Baker Botts L.L.P.

(57) ABSTRACT

A method for bridging traffic over a network includes receiving, at stations that are coupled to the network, forwarding information for remote devices that are coupled to the network via the stations. The forwarding information associates a remote address of each remote device with an address of one of the stations. Each station that receives the forwarding information stores the forwarding information in a forwarding database. The method also includes receiving traffic at a first station from a first remote device that is coupled to the first station. The traffic includes a destination address that is a remote address of a second remote device that is coupled to a second station of the network. Furthermore, the method includes identifying an address of the second station that is associated with the remote address of the second remote device in the forwarding database. The method also includes communicating the traffic directly to the second station using the identified address.

27 Claims, 3 Drawing Sheets

| REMOTE DEVICE ADDRESS | STATION ADDRESS | STATION LOCAL PORT |
|---|---|---|
| device_a_address |  | port_1 |
| device_b_address |  | port_2 |
| device_c_address |  | port_3 |
| device_d_address |  | port_4 |
| device_e_address | station_20b_address |  |
| device_f_address | station_20b_address |  |
| device_g_address | station_20b_address |  |
| device_h_address | station_20b_address |  |
| device_i_address | station_20d_address |  |
| device_j_address | station_20d_address |  |
| device_k_address | station_20d_address |  |
| device_l_address | station_20d_address |  |
| device_m_address | station_20e_address |  |
| device_n_address | station_20e_address |  |
| device_o_address | station_20e_address |  |
| device_p_address | station_20e_address |  |

*FIG. 3*

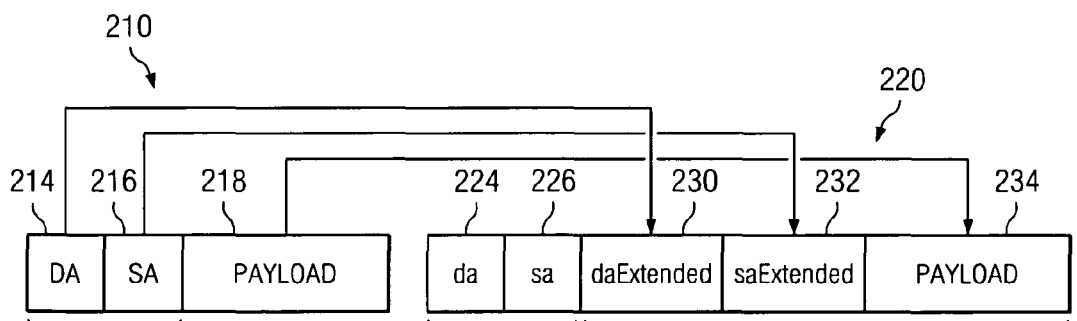

*FIG. 4*

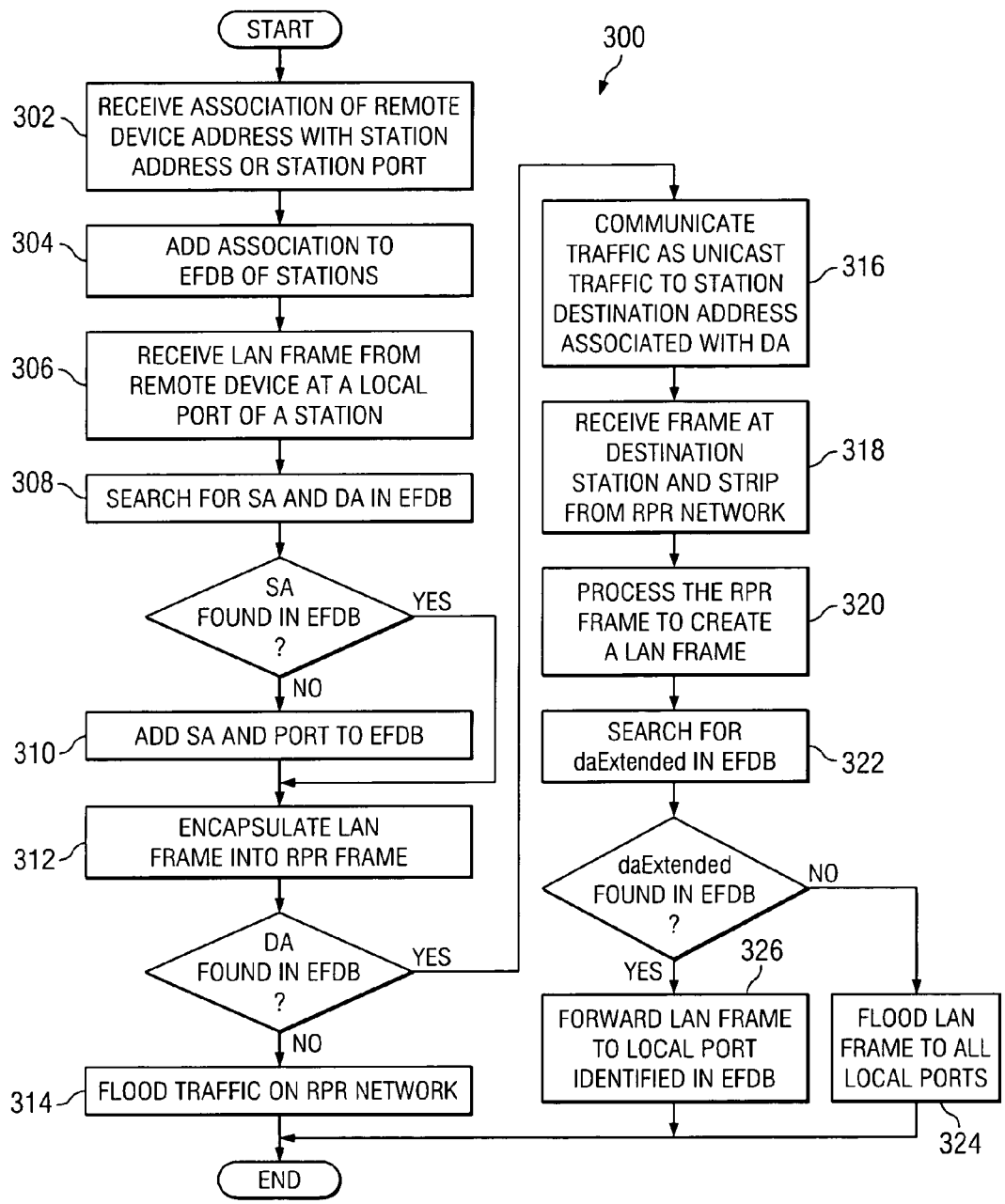

METHOD AND SYSTEM FOR BRIDGING TRAFFIC IN A RESILIENT PACKET RING NETWORK

TECHNICAL FIELD OF THE INVENTION

The present invention relates generally to communication systems and, more particularly, to a method and system for bridging local area network (LAN) traffic in a Resilient Packet Ring (RPR) network.

BACKGROUND OF THE INVENTION

RPR networks provide robust and efficient packet networking over a fiber ring topology. RPR technology is defined in IEEE Standard 802.17. This technology incorporates extensive performance monitoring, proactive network restoration, and flexible deployment capabilities. RPR networks have the ability to carry multiple services, including jitter- and latency-sensitive traffic (such as voice and video), as well as Ethernet and Internet protocol (IP) traffic. RPR technology combines the best features of legacy synchronous optical network (SONET)/synchronous digital hierarchy (SDH) networks and Ethernet networks into one layer to maximize network efficiency while delivering carrier-class service.

RPR networks are optimized to transport data traffic rather than circuit-based traffic. This packet transport, with bandwidth consumed only between source and destination nodes, is more efficient than a time division multiplexing (TDM) transport such as SONET/SDH. RPR also offers the ability to differentiate and provide improved service for jitter- and latency-sensitive traffic on the ring.

One of the advantages of RPR is its ability to provide spatial reuse in a ring network. For example, traffic can be communicated between two stations on the RPR ring without the traffic traveling around the entire ring. Thus, other segments of the ring may be used to transmit other traffic. However, such spatial reuse is often not possible in situations where traffic to or from a location remote to the network needs to be sent between stations on the RPR network. For example, local area network (LAN) traffic may be bridged across the RPR network. In such a case, the traffic may need to be "flooded" over the network for delivery to the intended destination, thus defeating spatial reuse and the associated network efficiency improvements.

SUMMARY OF THE INVENTION

The present invention provides a method and system for bridging LAN traffic in an RPR network that substantially eliminates or reduces at least some of the disadvantages and problems associated with previous methods and systems.

In accordance with a particular embodiment of the present invention, a method for bridging traffic over a network includes receiving, at stations that are coupled to the network, forwarding information for remote devices that are coupled to the network via the stations. The forwarding information associates a remote address of each remote device with an address of one of the stations. Each station that receives the forwarding information stores the forwarding information in a forwarding database. The method also includes receiving traffic at a first station from a first remote device that is coupled to the first station. The traffic includes a destination address that is a remote address of a second remote device that is coupled to a second station of the network. Furthermore, the method includes identifying an address of the second station that is associated with the remote address of the second remote device in the forwarding database. The method also includes communicating the traffic directly to the second station using the identified address.

Technical advantages of particular embodiments of the present invention include a method and system for bridging LAN or other similar traffic over an RPR network without having to flood the traffic over the network. By providing discovery of remote devices coupled to stations on an RPR network, the present invention allows the stations to unicast communications destined for a remote device directly to the station on the RPR network to which the remote device is coupled. This alleviates in most cases the need to flood this traffic on the RPR network, and thus allows spatial reuse on the RPR network.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 3 illustrates an example enhanced forwarding database according to one embodiment of the present invention;

FIG. 4 illustrates an example mapping of a LAN frame into an RPR frame according to one embodiment of the present invention; and FIG. 5 illustrates a flowchart of an example method for bridging traffic to and/or from remote devices in an RPR network according to one embodiment of the present invention.

DETAILED DESCRIPTION OF THE INVENTION

Figure 1:
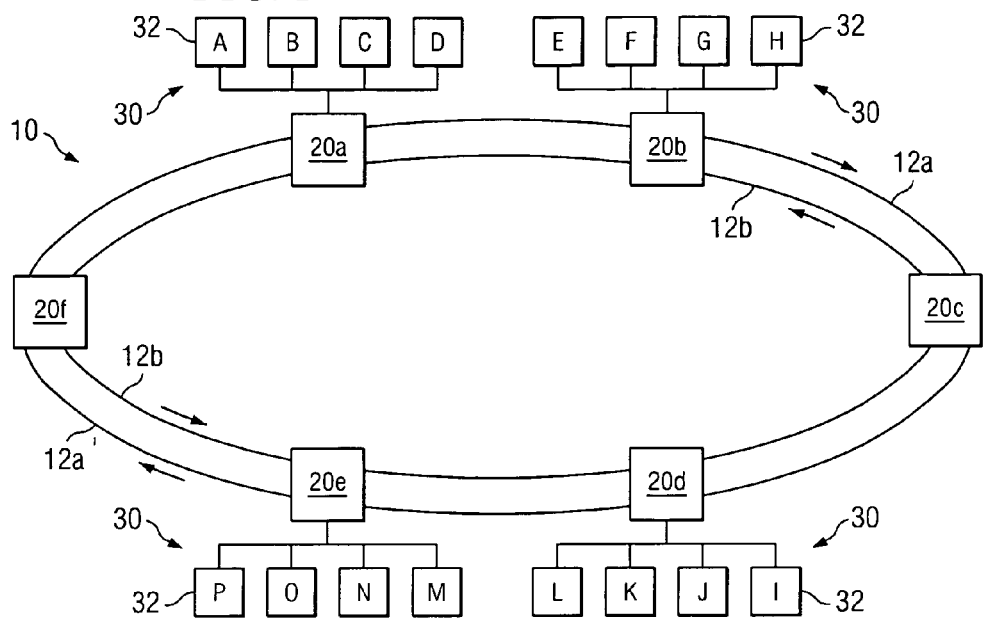
FIG. 1 illustrates an example RPR network according to an example embodiment of the present invention.

FIG. 1 illustrates an example RPR network 10 according to an example embodiment of the present invention. RPR technology uses a dual counter-propagating fiber ring topology to communicate information ("traffic") between stations 20a-20f connected using two rings 12a and 12b. Both rings 12 are used to transport working traffic between stations 20, with ring 12a carrying traffic in a clockwise ("eastbound") direction and ring 12b carrying traffic in a counter-clockwise ("west-bound") direction (in the example embodiment). By utilizing both rings 12, instead of keeping a spare ring for protection, RPR utilizes the total available ring bandwidth. Rings 12 are also used to carry control messages (for example, topology updates, protection, and bandwidth control). Although this description refers solely to RPR networks and operation, it should be understood that the present invention may apply, as appropriate, to any other suitable types of networks and communication protocols.

Stations 20 represent any hardware and/or software that receives information carried in RPR network 10, processes that information in any suitable fashion, and/or communicates information to network 10. Each station 20 may have one or more remote networks 30 (such as LANs) connected to it. For example, in example network 10, stations 20a, 20b, 20d, and 20e each have a LAN 30 connected to the station 20. Each LAN 30 may comprise one or more computers or other remote network devices 32. Stations 20 are directly connected to rings 12 and thus are "local" to network 10, whereas remote devices 32 are connected to network 10 through a station 20, and thus are "remote" to network 10. Each station 20 that serves to couple one or more remote devices 32 to network 10 is a "bridge."

Rings 12 may comprise any suitable links for communicating traffic between stations 20. For example, rings 12 may include any manner of optical communication medium, including optical fibers such as single-mode fiber, dispersion compensation fiber, dispersion-shifted fiber, or non-zero dispersion shifted fiber. Rings 12 may also include any other suitable optical components, such as EDFAs, repeaters, or optical-electronic-optical (OEO) converters. Rings 12 may also comprise non-optical medium. Traffic may be carried over rings 12 and other portions of RPR network 10 using RPR "frames" (packets). RPR frames can be transported over both SONET and Ethernet physical layers. For example, RPR frames can be encapsulated within a SONET/SDH synchronous payload envelope (SPE) using the Generic Framing Protocol (GFP) or using a high-level data-link control (HDLC)-like encapsulation.

RPR is a "Layer 2" (of the OSI model) network protocol, and thus the media access control (MAC) layer contains much of the functionality for the RPR network. The RPR MAC is responsible for providing access to rings 12. The RPR MAC can receive, transit, and transmit frames. In RPR, every station 20 has a 48-bit MAC address. The MAC will receive any frames with a matching destination address. The MAC can receive both unicast and multicast frames. Multicast frames are copied to the host and allowed to continue through the transit path. Matching unicast frames are stripped from the ring 12 on which they are received and do not consume bandwidth on downstream spans of the ring 12, thus allowing for spatial reuse. Frames with a non-matching destination address are allowed to continue circulating around the ring until they reach a station 20 for which they are destined or until the Time To Live (TTL) value contained in the frame reduces to zero (at which point the frame will be stripped from network 10).

RPR has a topology discovery mechanism that allows stations 20 on the rings 12 to be inserted/removed without manual management intervention. Each station 20 broadcasts its own topology information (such as station name and MAC address) to other stations 20, and receives the topology information of other stations 20. Based on the received topology information, an each station 20 establishes a topology map of the ring. This topology map can thus be used to determine which direction on rings 12 will provide the best path to the destination. For example, if traffic is to be communicated from station 20b to station 20c, station 20b can determine from the destination MAC address (the address of station 20c) and the topology map that the shortest path to send the traffic is on ring 12a.

However, this topology map only contains information about the local stations 20 directly connected to rings 12, not the remote devices 32 connected to stations 20. Thus, for example, if LAN traffic that is received from a remote device 32 connected to station 20a contains a destination MAC address for a remote device 32 connected to station 20b, station 20a does not know with which station 20 the destination address is associated and thus does not know the station 20 to which the traffic should be unicast. The current implementation of RPR, as detailed in IEEE Draft P802.17/D3.3 (Annex F), solves this issue by directing station 20a in this example to "flood" the traffic on the network such that all stations 20 that are bridges will receive the traffic and distribute it to all remote networks 30 that the stations 20 bridge to rings 12. However, because the traffic is flooded around the ring to all stations 20, spatial reuse is defeated.

One solution to this spatial reuse problem is to use IP routers as stations 20. In such a situation, the routers are able to use the IP layer routing protocol and the address resolution protocol (ARP) mechanism to determine the MAC address of the RPR station to which the destination remote device 32 is connected. Therefore, IP packets encapsulated in the RPR frames become "local" to the RPR ring, and flooding is avoided in most cases. Such rings can thus achieve spatial reuse.

However, many RPR stations are bridges or other similar devices—not routers (often because routers are more expensive than bridges). In these cases, flooding is still required in the current RPR standard, and thus spatial reuse cannot be implemented in many situations. Since spatial reuse is one of the most important aspects of RPR technology, this presents a problem. For example, maximum throughput of the RPR network 10 during flooding operations may be between one-quarter and one-half of the throughput under unicast operations, thus significantly affecting traffic flow in network 10. However, as described below, embodiments of the present invention provide a solution to this problem.

Figure 2:
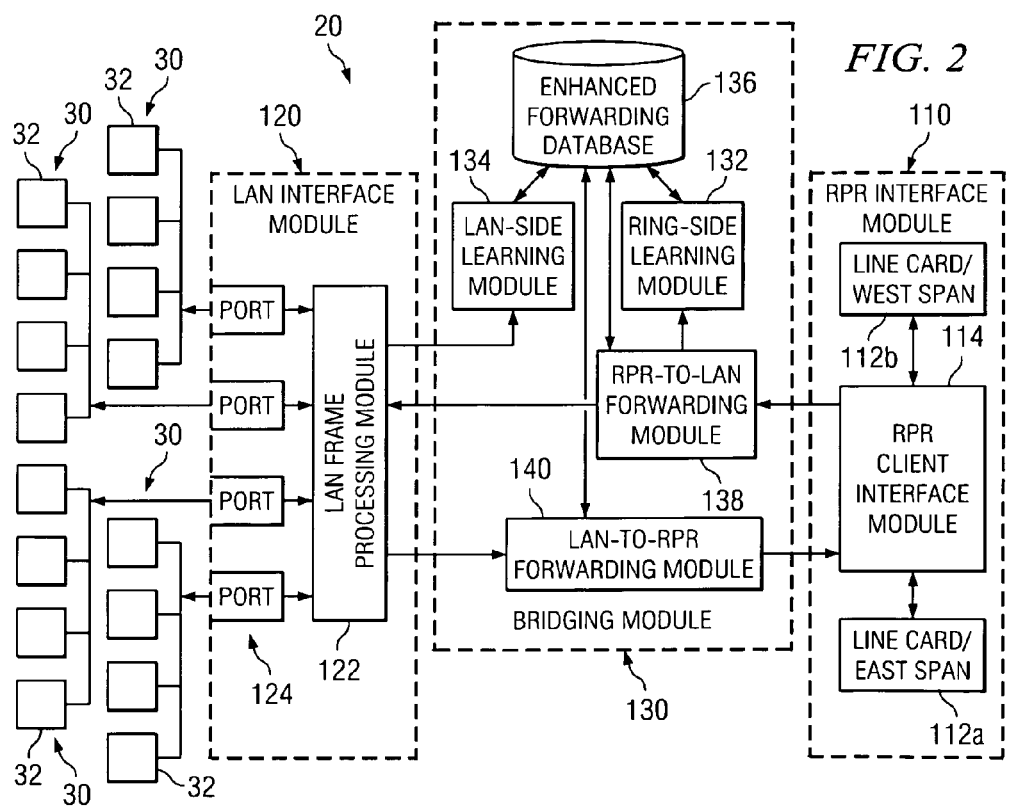
FIG. 2 illustrates an example RPR station according to one embodiment of the present invention.

FIG. 2 illustrates an example RPR station 20 according to one embodiment of the present invention. Station 20 acts as a bridge between a number of LANs 30 and the RPR network 10 to which station 20 is connected. As illustrated, station 20 includes three modules that allow it to perform this bridging function: an RPR interface module 110, a LAN interface module 120, and a bridging module 130. Modules 110, 120, and 130, as well as the components that comprise these modules, may be implemented using any suitable combination of hardware, firmware, and/or software at one or more locations. As only an example, all three modules 110, 120, and 130 may be implemented using ASICs, FPGAs, microprocessors, or other suitable components on a card that may be plugged in a common backplane to form an RPR station in a network element. Although particular components are illustrated at a functional level, it should be understood that station 20 may include any number of other components and the functions, of the illustrated components may be distributed and/or combined in various components of station 20 in any suitable manner.

RPR interface module 110 serves as an interface between station 20 and rings 12 of the RPR network 10 and thus is responsible for sending traffic to and receiving traffic from RPR network 10. RPR interface module 110 includes two line interfaces 112a and 112b, which serve as the physical layer (PHY) interface with rings 12a and 12b, respectively. Line interfaces 112 are each connected to an RPR client interface module 114. Client interface module 114 performs all RPR functions relating to the sending and receipt of traffic from the RPR network. For example, client interface module 114 performs ringlet selection, traffic shaping, frame reception, processing, queuing, encapsulation and decapsulation, protection switching, OAM, and any other appropriate functions.

LAN interface module 120 includes a LAN frame processing module 122 that serves as an interface between station 20 and the one or more remote networks 30, such as LANs, connected to station 20. LAN frame processing module 122 receives frames (such as Ethernet frames) from remote devices 32 connected to networks 30 and forwards them to bridging module 130. LAN frame processing module 122 performs all LAN MAC layer functions, including classification, queuing, and buffering.

Bridging module 130 is connected between RPR interface module 110 and LAN interface module 120, and it functions to bridge traffic between rings 12 of RPR network 10 and remote devices 32 (as well as to communicate and receive any traffic originated at or for station 20 itself). Bridging module 130 includes a ring-side learning module 132 and LAN-side learning module 134 that receive and process information about the location of both stations 20 and remote devices 32 connected to network 10 and store this information in an enhanced forwarding database (EFDB) 136.

LAN-side learning module 134 is connected to LAN frame processing module 122 and learns the source MAC address of remote devices 32 from the LAN frames sent to LAN frame processing module 122 from the remote devices 32. Again, although MAC addresses are used as an example throughout this description, any the appropriate addressing information may be used instead of or in addition to the MAC address. In addition, LAN frame processing module 122 indicates to LAN-side learning module 134 the port 124 of station 20 over which the source MAC address was received (i.e., the port to which the remote device 32 sending the frame is attached). LAN-side learning module 134 then adds this MAC address and port information to EFDB 136, as described below.

Similarly, ring-side learning module 132 learns the MAC address information of a remote device 32 connected to another RPR station 20 by receiving the extended RPR data frames sent out from that RPR station 20 as a flooded frame to all RPR stations or as a unicast frame to the receiving RPR station. This information is added to EFDB 136 by ring-side learning module 132. However, due to short transit time and complexity, a receiving RPR station 20 does not learn from the unicast frames destined to other RPR stations 20. Therefore, ring-side learning module 132 alone cannot produce a complete and consistent forwarding database for all RPR stations. The MAC addresses of some remote devices 32 may be learned by some RPR stations 20 on a ring, but may never be learned by other RPR stations 20 on the ring.

For example, referring to FIG. 1, assume remote device 32a connected to station 20a sends a LAN frame to remote device 32l connected to station 20d. Because the MAC address of remote device 32l is unknown to station 20a, station 20a encapsulates the LAN frame in an extended RPR frame and floods the RPR frame on the ring. All stations 20 on the ring receive the flooded frame and learn the MAC address of remote device 32a which is connected to station 20a. Next, if remote device 32l responds to remote device 32a, RPR station 20d uses the learned MAC address of remote device 32a and sends a unicast RPR frame to station 20a via ring 12b (for example). When station 20a receives this response frame, it learns that remote device 32l is connected to RPR station 20d. However, because the unicast frame only travels over part of ring 12b, only stations 20c and 20b see this unicast frame (stations 20e and 20f do not see this unicast frame). Therefore, station 20e cannot learn the MAC address of remote device 32l). In addition, because stations 20b and 20c do not learn from the unicast frame, they may also not learn the MAC address of remote device 32l. Therefore, if remote devices 32 connected to stations 20b or 20e want to send a frame to remote device 32l, the frame must be flooded until the address of remote device 32l is learned by stations 20b and 20e. However, as described above, flooding has the disadvantage of defeating spatial reuse in network 10.

Therefore, embodiments of the present invention provide a mechanism for discovery at each station 20 of the MAC address and/or other addressing information of the remote devices 32 connected to other stations 20. Embodiments of the present invention may perform discovery of the MAC address of remote devices 32 in any suitable fashion. In one embodiment, an RPR station 20 that has remote devices 32 connected to it periodically broadcasts the address information ("forwarding information") of these remote devices 32 to all other RPR stations 20 using RPR control frames. This address information can be dynamically learned or statically provisioned. The station 20 learns that a remote device 32 is connected to the station 20 when the station 20 receives LAN frames from the remote device 32. A network management system can be used to provision MAC addresses on ports 124 of the station 20. In this way, all RPR stations 20 that will bridge the LAN traffic to remote devices 32 broadcast their connected remote devices 32 and receive the address information of the remote devices 32 connected to other RPR stations 20. All the address information may be stored in EFDB 136. In this way, all the EFDB contents of all RPR stations 20 are complete and consistent. Each RPR station 20 that will bridge LAN traffic to remote devices 32 thus has a complete network-wide view of reachable remote devices 32 and the RPR stations 20 to which these remote devices 32 are connected. Unicast transmission on RPR network 10 is then applied when sending unicast LAN frames to the corresponding RPR stations 20.

As one example, attribute discovery (ATD) control frames (as defined in the RPR standard) can be used to transmit the remote device forwarding information described above. For example, this forwarding information may be included in the Organization Specific Attribute section of an ATD frame. Such forwarding information may be sent out at regular intervals (which may be the same or different than the intervals used to send out standard topology discovery messages) or may be sent out upon certain events (such as a remote device 32 joining or leaving a remote network 30 connected to a station 20). This technique allows all stations 20 to receive the same forwarding information about remote devices 32 since all stations 20 receive these ATD frames. When a station 20 receives such a frame, RPR client interface 114 can communicate the received forwarding information to ring-side learning module 132. If this association of the remote device 32 address with a particular station 20 address is new or has changed, ring-side learning module 132 may then add it to or update it in EFDB 136. In addition, the dynamic address information in EFDB 136 may be subject to aging out.

Although the Organization Specific Attribute section of an ATD frame is used as an example of where the forwarding information can be communicated to the various stations 20, any other appropriate portions of an ATD frame, or any other type of RPR frame, may be used to communicate this information. Furthermore, although two particular examples of learning techniques are described, any other suitable techniques for learning forwarding information for remote devices 32 may be used and is included within the scope of the present invention.

Referring again to FIG. 2, station 20 also includes RPR-to-LAN forwarding module 138 and LAN-to-RPR forwarding module 140. As implied by their names, RPR-to-LAN forwarding module 138 communicates traffic received from one or more other stations 20 connected to RPR network 10 to appropriate remote devices 32 connected to station 20, and LAN-to-RPR forwarding module 140 communicates traffic received from remote devices 32 connected to station 20 to one or more other stations 20 connected to the RPR network 10. As is described in more detail below in conjunction with FIG. 5, forwarding modules use the forwarding information stored in EFDB 136 (as well as information in the topology database created from the topology discovery messages) to communicate traffic to and from remote devices 32 using unicast communications, thus avoiding the use of flooding. Such unicast communications are possible due to the ability to look up the station 20 with which a remote device 32 is associated, and thus the ability to send unicast RPR frames destined for a remote device 32 directly to the station 20 to which the device 32 is connected.

FIG. 3 illustrates an example EFDB 136 according to one embodiment of the present invention. EFDB 136 (represented in a tabular format for purposes of illustration) includes three different types of information. It includes the address 160 of one or more remote devices 32 connected to network 10, as well as either the address 162 of the station 20 to which each device 32 is connected or the local port 124 of a station 20 to which the device 32 is connected. For remote devices 32 that are connected to the station 20 in which the EFDB 136 is stored, the address of the device 32 is associated with a local port 124 of the station 20 (since traffic to that device 32 should be communicated to the local port 124 instead of to another station 20 on network 10). On the other hand, for remote devices 32 that are not directly connected to the station 20 in which the EFDB 136 is stored, the address of the device 32 is associated with the address of the station 20 to which the device 32 is connected (since traffic to that device 32 should first be communicated over network 10 to the station 20 with which the device 32 is associated).

The example EFDB 136 illustrated in FIG. 3 is an example EFDB 136 stored at station 20a in the example network 10 illustrated in FIG. 1. Since remote devices 32a-32d are connected to station 20a, the illustrated EFDB 136 includes the address of each of these devices 32 associated with a local port number of station 20a. In this example, each device 32 is associated with a different port number, however one or more LANs may be connected to each port, and thus multiple remote device addresses may be associated with a single port. Furthermore, since remote devices 32e-32p are associated with other stations 20 in network 10, the address of each of these devices 32 is associated with the address of the associated station 20. In this example, the address of each of devices 32e-32h is associated with the address of station 20b, the address of each of devices 32i-32l is associated with the address of station 20d, and the address of each of devices 32m-32p is associated with the address of station 20e.

As described above, the address of remote devices 32 included in EFDB 136 may be a MAC address, a VID, and/or any other suitable address(es) suitable to communicate traffic to a remote device 32. Similarly, the address of stations 20 included in EFDB 136 may be a MAC address and/or any other address(es) suitable to communicate traffic to a station 20. In addition, EFDB 136 may contain other information related to the EFDB updating behavior and frame forwarding behavior. Such additional information may include but is not limited to the following: whether an address entry in EFDB 136 is provisioned or dynamically learned, when the address entry will be aged out, whether and how the address entry is used for filtering a frame, and which ring is used for sending a frame containing the address to the destination. Such additional information can be calculated by the station 20 locally or based on the received information from another station 20.

Furthermore, as illustrated, EFDB 136 is separate from the RPR topology database that is generated at stations 20 using the RPR topology discovery messages described above. However, the information in these two databases may be combined into a single database. Furthermore, the information in EFDB 136 may be stored in any other appropriate format and may be distributed among multiple databases or combined with any other databases.

FIG. 4 illustrates an example mapping of a LAN frame 210 into an RPR frame 220 according to one embodiment of the present invention. LAN frame 210 is a simplified version of an Ethernet or other type of LAN frame. As illustrated, LAN frame 210 includes a header 212 that contains a LAN destination address (DA) 214 and a LAN source address (SA) 216. It should be understood that header 212 often will include additional information, although such information is not illustrated in this simplified version. LAN frame 210 further includes a payload section 218 that contains traffic to be communicated from the source device to the destination device. For example, the source device may be a remote device 32 connected to a first station 20 and the destination device may be a remote device 32 connected to another station 20.

RPR frame 220 is a simplified version of a standard RPR frame with an extended frame format. RPR frame 220 includes a header 222 that contains an RPR destination address (da) 224 and an RPR source address (sa) 226 (the addresses of the source and destination stations 20 on RPR network 10). It should be understood that header 222 often will include additional information, although such information is not illustrated in this simplified version. Furthermore, an actual RPR frame may also include a trailer. RPR frame 220 further includes a payload section 228 that includes an extended destination address (daExtended) 230, an extended source address (saExtended) 232, and a data segment 228. daExtended 230 and saExtended 232 are the final destination address and the original source address, respectively, assuming that the da 224 is not the final destination address and/or the sa 226 is not the original source address (for example, if the frame 210 was sent by and/or destined for a remote device 32 instead of a station 20).

As an example, in a situation where remote device 32a connected to station 20a is sending traffic to remote device 32e connected to station 20b, a LAN frame 210 sent from remote device 32a may be mapped into an RPR frame 220 for transport over RPR network 10. More specifically, remote device 32a communicates one or more LAN frames 210 each including a DA 214 of remote device 32e (for example, its MAC address), a SA 216 of remote device 32a, and traffic in payload section 218. Each such LAN frame 210 is received at station 20a, where it is mapped into an RPR frame 220 for communication over RPR network 10 to station 20b. More specifically, station 20a looks up the station address in EFDB 136 that is associated with the DA 214 in LAN frame 210. This station address (the address of station 20b) is then added as the da 224 in the RPR frame 220, and the address of station 20a is added as the sa 226. Furthermore, the DA 214 of the LAN frame 210 is added as the daExtended 230 of the RPR frame 220, and the SA 215 of the LAN frame 210 is added as the saExtended 232 of the RPR frame 220. Finally, the traffic in payload section 218 of the LAN frame 210 is mapped into the data section 234 of the RPR frame 220. Furthermore, any other appropriate information may be mapped from LAN frame 210 to RPR frame 220, and/or information may be generated at station 20a and added to RPR frame 220.

The RPR frame 220 is then unicast from station 20a to station 20b based on da 224, thus allowing spatial reuse in RPR network 10. Upon reaching station 20b, station 20b strips off header 222 of the RPR frame 220 to create a LAN frame 210 (or otherwise converts the RPR frame 220 into a LAN frame 210 by mapping daExtended 230 to DA 214 and saExtended 232 to SA 216). This LAN frame is then communicated to remote device 32e, since the DA 214 is the address of remote device 32e. Station 20b may look-up in EFDB 136 a port 124 of station 20b to which the LAN frame 210 is to be communicated based on DA 214 (i.e., daExtended 230). Station 206 can then communicate the LAN frame 210 to remote device 32e via the identified port 124.

FIG. 5 illustrates a flowchart of an example method 300 for bridging traffic to and/or from remote devices 32 in an RPR network. Method 300 begins at step 302 where the various stations 20 in an RPR network, such as network 10, receive information associating the address of each of one or more remote devices 32 with the address of a station 20 in the network to which the remote device is connected (forwarding information). Alternatively, if the remote device 32 is connected to the station 20 receiving the information, then the forwarding information associates the address of the remote device 32 with a local port of the station 20. This forwarding information may be learned as described above or using any other suitable technique. At step 304, the received forwarding information is stored in an appropriate location, such as EFDB 136, for future use. Steps 302 and 304 may be performed multiple times during the course of method 300 and may occur at any time in the method 300 (even though these steps are illustrated at the beginning of method 300).

At step 306, a station 20 in the RPR network (for example station 20a in network 10 of FIG. 1) receives a LAN frame from a remote device 32 (for example, remote device 32a) via a port 124 of station 20a. The LAN frame includes an SA and a DA, as described above. For the purposes of example, this example method assumes that the DA is the address of a remote device 32e connected to station 20b. Station 20a, in this example, searches for the SA (which is the LAN address of remote device 32a) and the DA in its EFDB 136 or other similar database at step 308. If the SA is not found in EFDB 136, then at step 310 station 20a adds the SA to its EFDB 136 and associates this SA with the local port 124 of station 20a over which the frame that contained the SA was received. If the SA is found in EFDB 136 or after the SA is added to EFDB 136 at step 310, the method proceeds to step 312, where the received LAN frame is encapsulated into an RPR frame. For example, as described above, the payload of the LAN frame is put into the payload of the RPR frame. In addition, the SA and DA of the LAN frame are placed in the RPR frame payload as saExtended and daExtended, respectively. Furthermore, the address of station 20a becomes the sa in the RPR frame.

If the DA in the LAN frame is not found in the EFDB 136 at step 308 (for example, because station 20a has not received forwarding information for that particular DA), station 20a adds the DA of the LAN frame as the da of the RPR frame and floods it on the network at step 314. The various stations 20 in network 10 process this flooded message as described in the RPR standard (IEEE Draft P802.17/D3.3, Annex F), and the method ends. As described above, this flooding prevents spatial reuse in the RPR network. However, if the DA in the LAN frame is found in the EFDB 136 at step 308, then at step 316 station 20a inserts the station address associated with the DA in EFDB 136 as the da of the RPR frame and unicasts this RPR frame to the station identified by this station address (for example, station 20b).

At step 318, station 20b (in this example) receives the RPR frame and strips it from the RPR network (since it is a unicast frame—thus allowing spatial reuse). At step 320, station 20b process the RPR frame to create a LAN frame. This processing is specified in the RPR standard and may include checking, stripping, adjusting, or any other appropriate functions. For example, station 20b may strip off the header (and trailer) to leave the LAN frame that was originally encapsulated by station 20a. At step 322, station 20b searches its EFDB 136 or any other appropriate database for the daExtended included in the frame (i.e., the address of remote device 32e). If the daExtended is not found in the EFDB 136, station 20b floods the processed LAN frame to all the ports 124 of station 20b at step 324. However, if the daExtended is found in the EFDB 136, then station 20b forwards the LAN frame to the port 124 identified in the EFDB 136, and the method ends.

The method, or portions thereof, may be repeated each time a LAN frame is received at a station and is to be communicated to another station 20 or a remote device 32 connected to another station 20. It should be understood that some of the steps illustrated in FIG. 5 may be combined, modified or deleted where appropriate, and additional steps may also be added to the flowchart. Additionally, as indicated above, the steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of components included within stations 20, other and different components may be utilized to accommodate particular needs. The present invention contemplates great flexibility in the arrangement of these elements as well as their internal components.

Furthermore, numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for bridging traffic over a resilient packet ring (RPR) network, comprising:

at each of a plurality of RPR stations coupled to the network, determining the remote address of one or more remote devices that are coupled to each particular station;

at each of the plurality of stations, communicating forwarding information to each of the other stations coupled to the ring in one or more RPR attribute discovery (ATD) control frames, the forwarding information associating the remote address of each of the remote devices coupled to the particular station with an address of the station;

at each of the plurality of stations, receiving the forwarding information from the other stations coupled to the ring;

at each station receiving the forwarding information, storing the forwarding information in a forwarding database of the station;

after completing the previous steps, then at a first station of the plurality of stations, receiving traffic from a first remote device coupled to the first station, the traffic including a destination address that comprises a remote address of a second remote device coupled to a second station of the plurality of stations;

at the first station, identifying an address of the second station associated with the remote address of the second remote device in the forwarding database of the first station, wherein the remote address of the second remote device was stored in the forwarding database of the first station in the previous steps; and communicating the traffic from the first station directly to the second station using the identified address of the second station.

2. The method of claim 1, further comprising:
receiving the traffic at the second station;
identifying a port of the second station with which the second remote device is associated based on the remote address of the second remote device included in the traffic;
communicating the traffic to the identified port.

3. The method of claim 1, wherein receiving forwarding information comprises receiving a control frame from a station that associates a remote address of a remote device coupled to the station with an address of the station.

4. The method of claim 1, wherein receiving forwarding information comprises:
receiving one or more data frames from a station that include an address of the station and the remote address of a remote device coupled to the station; and
associating the remote address with the address of the station.

5. The method of claim 1, wherein:
the traffic received from the first remote device further includes a source address that comprises a remote address of the first remote device; and
communicating the traffic further comprises encapsulating the received traffic into a frame suitable for communication to the second station via the network, wherein encapsulating the received traffic comprises adding a header to the traffic, the header including a destination address that comprises the identified address of the second station and a source address that comprises the address of the first station.

6. The method of claim 1, wherein communicating the traffic directly to the second station comprises unicasting the traffic to the second station.

7. The method of claim 1, wherein communicating the traffic directly to the second station comprises not flooding the traffic on the network.

8. The method of claim 1, wherein the first and second remote devices comprise LAN devices, and the first and second remote addresses comprise LAN addresses.

9. A system for bridging traffic over a resilient packet ring (RPR) network, comprising:
a plurality of RPR stations coupled to the network, the stations comprising at least a first station and a second station;
one or more remote devices coupled to each of at least the first and second stations;
the first station comprising:
a learning module operable to determine the remote address of one or more remote devices that are coupled to the station;
a network interface module configured to be coupled to the network and operable to communicate to each of the other stations forwarding information for the remote devices coupled to the first station in one or more RPR attribute discovery (ATD) control frames and to receive forwarding information from the second station each of the other stations for one or more of the remote devices coupled to each of the other stations in one or more RPR ATD control frames, the forwarding information associating a remote address of each remote device with an address of the station to which the remote device is coupled;
a memory storing a forwarding database operable to store the forwarding information;
a remote network interface module operable, once the learning module has determined the remote address of one or more remote devices that are coupled to the station, and once the network interface module has communicated to each of the other stations forwarding information for the remote devices coupled to the station, to receive traffic from a first remote device coupled to the first station, the traffic including a destination address that comprises a remote address of a second remote device coupled to the second station;
a bridging module operable to identify the address of the second station associated with the remote address of the second remote device in the forwarding database; and
the network interface module further operable to communicate the traffic directly to the second station using the identified address.

10. The system of claim 9, wherein the second station comprises:
a network interface module operable to receive the traffic;
a bridging module operable to identify a port of the second station with which the second remote device is associated based on the remote address of the second remote device included in the traffic;
a remote network interface module operable to communicate the traffic to the identified port.

11. The system of claim 9, wherein receiving forwarding information comprises receiving a control frame from the second station that associates a remote address of a remote device coupled to the second station with an address of the second station.

12. The system of claim 9, wherein receiving forwarding information comprises:
receiving one or more data frames from the second station that include an address of the second station and the remote address of a remote device coupled to the second station; and
associating the remote address with the address of the second station.

13. The system of claim 9, wherein:
the traffic received from the first remote device further includes a source address that comprises a remote address of the first remote device; and
communicating the traffic further comprises encapsulating the received traffic into a frame suitable for communication to the second station via the network, wherein encapsulating the received traffic comprises adding a header to the traffic, the header including a destination address that comprises the identified address of the second station and a source address that comprises the address of the first station.

14. The system of claim 9, wherein communicating the traffic directly to the second station comprises unicasting the traffic to the second station.

15. The system of claim 9, wherein communicating the traffic directly to the second station comprises not flooding the traffic on the network.

16. The system of claim 9, wherein the first and second remote devices comprise LAN devices, and the first and second remote addresses comprise LAN addresses.

17. A station for bridging traffic over a resilient packet ring (RPR) network, the network comprising a plurality of RPR stations coupled to the network and one or more remote devices coupled to each of the stations, each station comprising:

a learning module operable to determine the remote address of one or more remote devices that are coupled to the station;

a network interface module configured to be coupled to the network and operable to communicate to each of the other stations forwarding information for the remote devices coupled to the station in one or more RPR attribute discovery (ATD) control frames and to receive forwarding information for other remote devices from each of the stations to which those remote devices are coupled in one or more RPR ATD control frames, the forwarding information associating a remote address of each remote device with an address of to which each remote device is coupled;

memory storing a forwarding database operable to store the forwarding information;

a remote network interface module configured to be coupled to the remote devices and operable, once the learning module has determined the remote address of one or more remote devices that are coupled to the station, and once the network interface module has communicated to each of the other stations forwarding information for the remote devices coupled to the station, to receive traffic from a first remote device coupled to the station, the traffic including a destination address that comprises a remote address of a second remote device coupled to another station;

a bridging module operable to identify an address of the station associated with the remote address of the second remote device in the forwarding database; and the network interface module further operable to communicate the traffic directly to the station with which the second remote device is associated using the identified address.

18. The station of claim 17, wherein receiving forwarding information comprises receiving a control frame from a station that associates a remote address of a remote device coupled to the station with an address of the station.

19. The station of claim 17, wherein receiving forwarding information comprises:
  receiving one or more data frames from a station that include an address of the station and the remote address of a remote device coupled to the station; and
  associating the remote address with the address of the station.

20. The station of claim 17, wherein:
  the traffic received from the first remote device further includes a source address that comprises a remote address of the first remote device; and
  communicating the traffic further comprises encapsulating the received traffic into a frame suitable for communication to the station with which the second remote device is associated, wherein encapsulating the received traffic comprises adding a header to the traffic, the header including a destination address that comprises the identified address of the station with which the second remote device is associated and a source address that comprises the address of the station with which the first remote device is associated.

21. The station of claim 17, wherein communicating the traffic directly to the station comprises unicasting the traffic to the station.

22. The station of claim 17, wherein communicating the traffic directly to the station comprises not flooding the traffic on the network.

23. The station of claim 17, wherein the first and second remote devices comprise LAN devices, and the first and second remote addresses comprise LAN addresses.

24. A method for bridging traffic over a resilient packet ring (RPR) network, comprising:
  at each of a plurality of RPR stations coupled to the network, determining the remote address of one or more LAN devices that are coupled to each particular station;
  at each of the plurality of stations, communicating forwarding information to each of the other stations coupled to the ring in one or more RPR attribute discovery (ATD) control frames, the forwarding information associating the LAN address of each of the LAN devices coupled to the particular station with an address of the station;
  at each of the plurality of stations, receiving the forwarding information from the other stations coupled to the ring;
  at each station receiving the forwarding information, storing the forwarding information in a forwarding database of the station;
  after completing the previous steps, then at a first station of the plurality of stations, receiving traffic from a first LAN device coupled to the first station, the traffic including a destination address that comprises a LAN address of a second LAN device coupled to a second station of the plurality of stations;
  at the first station, identifying an address of the second station associated with the LAN address of the second LAN device in the forwarding database of the first station, wherein the remote address of the second remote device was stored in the forwarding database of the first station in the previous steps;
  encapsulating the received traffic into an RPR frame, wherein encapsulating the received traffic comprises adding a header to the traffic, the header including a destination address that comprises the identified address of the second station and a source address that comprises the address of the first station;
  communicating the traffic directly from the first station to the second station using the identified address of the second station;
  receiving the traffic at the second station;
  identifying a port of the second station with which the second LAN device is associated based on the LAN address of the second LAN device included in the traffic; and
  communicating the traffic to the identified port.

25. The method of claim 1, wherein the forwarding information is included in an Organization Specific Attribute of the ATD control frame.

26. The system of claim 9, wherein the forwarding information is included in an Organization Specific Attribute of the ATD control frame.

27. The station of claim 17, wherein the forwarding information is included in an Organization Specific Attribute of the ATD control frame.

* * * * *